Figure 1:
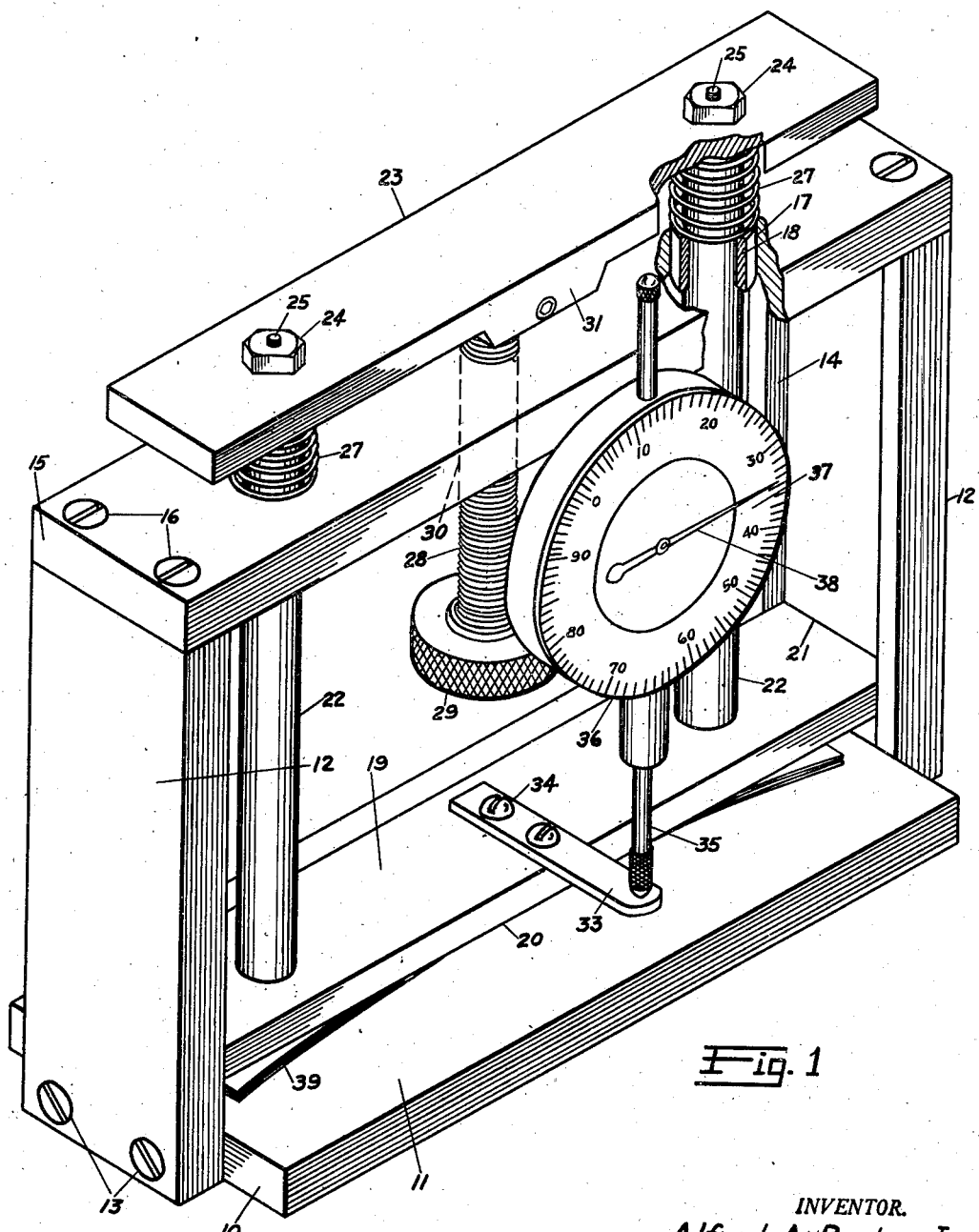

Sept. 17, 1946.   A. A. BOEHM, JR   2,407,648
WARPAGE MEASURING MACHINE
Filed March 16, 1945

INVENTOR.
Alfred A. Boehm Jr.
BY
Ralph L Chappell
ATTORNEY.

Patented Sept. 17, 1946

2,407,648

UNITED STATES PATENT OFFICE 2,407,648

WARPAGE MEASURING MACHINE

Alfred A. Boehm, Jr., New York, N. Y.

Application March 16, 1945, Serial No. 583,142

1 Claim. (Cl. 33—147)

(Granted under the act of March 3, 1883, as amended April 30, 1928; 370 O. G. 757)

The present invention concerns a machine for measuring warpage in a piece of semi-rigid material and particularly concerns a machine for measuring warpage in warped samples of laminated material or plastic material.

In machines of the class described it is essential that the measurements be made with precision and accuracy and it is further essential that the results be reproducible so that measurements made on different warped samples of material will give truly comparable indications of warpage.

To this end it has been found that machines which clamp or otherwise rigidly secure the warped sample during measurement tend to cause distortion of the material with the result that accurate and reproducible results can not be obtained. The present invention overcomes this objection by providing a machine in which measurements are made on a warped sample while it is in a free and unclamped relationship with the machine.

One object of the invention is to provide an improved method of determining warpage in samples of warped materials.

Another object is to provide a machine in which measurements on warped samples of materials are made with accuracy and precision.

Another object is to provide a machine in which such measurements are made so that the results obtained are reproducible and measurements made on separate samples afford a true comparison of warpage.

Another object is to provide a machine in which such measurements are made on a sample while it is in a free and unclamped relationship relative to the machine.

Further objects and advantages of this invention, as well as its construction, arrangement and operation, will be apparent from the following description and claim in connection with the accompanying drawing, in which, Figure 1 is an isometric view of a preferred embodiment of the invention.

The figure shows a preferred form of machine as comprising a bedplate 10 having a flat upper contact face 11 which may be rectangular in shape. Vertical supports 12 extend perpendicularly upward from face 11 and are secured to the ends of bedplate 10 by screws 13. Vertically extending grooves 14 are provided in supports 12. A crossbeam 15 parallel to bedplate 10 joins the upper extremities of supports 12 and is secured in place by screws 16. A pair of vertical bores 17 lined with sleeve bushings 18 are provided in crossbeam 15. Bedplate 10, supports 12 and crossbeam 15 form a rigid framework for the machine.

Adapted for reciprocating movement relative to the rigid framework is a contact plate or crosshead 19 having a flat lower contact face 20 which is rectangular in shape and disposed parallel to contact face 11 of bedplate 10. The extremities of contact plate 19 are provided with tongues 21 adapted for sliding engagement in grooves 14 to guide the contact plate during reciprocation. Lift rods 22 are secured to contact plate 19 near the ends thereof and extend vertically upward through bushings 18 in crossbeam 15. A tierod 23 connects the upper ends of lift rods 22 which extend above crossbeam 15 and is secured thereto by nuts 24 threaded on studs 25 on the upper extremities of lift rods 22. Contact plate 19, lift rods 22 and tierod 23 form a rigid assembly adapted for reciprocation relative to bedplate 10.

Compression springs 27 are disposed about the upper ends of lift rods 22 between tierod 23 and crossbeam 15 and serve to urge the reciprocating assembly including contact plate 19 upwardly at all times. A lift screw 28 having a knurled head 29 is threaded through crossbeam 15 at 30 and at its upper end is mounted for free rotation in a depending boss 31 on tierod 23. Rotation of the lift screw serves to raise and lower contact plate 19 relative to bedplate 10.

An offset 33 is secured by screws 34 to contact plate 19 and is adapted for contact with a depending plunger 35 on gauge 36. Gauge 36 may be detachably secured to crossbeam 15 in any desired manner (not shown). Gauge 36 is provided with a dial face 37 which may be rotated to calibrate the gauge to proper zero indication, and a pointer 38.

A piece of warped material whose warpage is to be measured is indicated at 39 between bedplate 10 and contact plate 19.

Operation of the machine is as follows. Before a warped sample to be measured is placed in the machine, contact plate 19 is lowered by adjusting lift screw 28 until face 20 is in contact with face 11 of bedplate 10. Dial face 37 of gauge 36 is then adjusted until its zero calibration mark registers with pointer 38. Contact plate 19 is then withdrawn upwardly and a sample 39 of warped material to be measured is placed on bedplate 10. If the sample is of generally rectangular shape it is desirable that at least three corners of the lower surface of the sample be in contact with the bedplate. Contact plate 19 is then lowered until its contact face 20 is in contact with the highest point on the upper surface of the sample. A reading of gauge 36 is then made by noting the mark on dial face 37 with which pointer 38 registers.

It will be seen that such reading is an indication of the warpage of the material plus the thickness of the material. Therefore by subtracting the known thickness of material 39 from the dial reading the actual warpage will be computed. If desired, the actual warpage may be divided by the length of the sample to give an indication of warpage for unit length of sample. These computations may be made by use of the following formula:

$$\text{Warp} = \frac{100(H-T)}{L}$$

where

H = dial reading
T = thickness of material
L = length of specimen

In making the test described above it has been found desirable to place a piece of frosted glass behind the machine with suitable illumination to the rear of the glass so that the sample being measured is observed in silhouette. The operator is situated in front of the machine so that bedplate 10 is at eye level. Contact between the upper warped surface of sample 39 and face 20 of contact plate 19 is judged by visual determination and it has been found that this technique is accurate to ±0.002 inch.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

A machine for measuring warpage in a piece of warped semi-rigid material comprising a rigid framework having a flat bedplate, a pair of spaced standards extending perpendicularly from the bedplate and a crossbeam extending between said standards and parallel to said bedplate and having guide portions therein, a crosshead parallel to said bedplate and extending between said standards, said crosshead being adapted for reciprocating movement between said crossbeam and bedplate, tongues on said crosshead for sliding within guide grooves cut in said standards to guide the crosshead during reciprocation, guide columns attached to said crosshead and extending perpendicularly from said crosshead for reciprocating movement relatively to said guide portions within said crossbeam whereby said crosshead is further guided during reciprocation, said bedplate and said crosshead having opposed faces which are parallel at all times and adapted to contact opposite surfaces of the piece of material, and an indicator positioned to indicate the distance between the opposed faces of said bedplate and said crosshead whereby to indicate a measure of the warpage of the piece of warped material.

ALFRED A. BOEHM, Jr.